United States Patent
Webster et al.

(10) Patent No.: US 8,397,628 B2
(45) Date of Patent: Mar. 19, 2013

(54) DRIPLESS BREW BASKET

(75) Inventors: Joseph P. Webster, St. Charles, MO (US); Jody G. Jacobsen, St. Charles, MO (US)

(73) Assignee: Newco Enterprises, Inc., St. Charles, MO (US)

( * ) Notice: Subject to any disclaimer, the term of this patent is extended or adjusted under 35 U.S.C. 154(b) by 630 days.

(21) Appl. No.: 12/322,766

(22) Filed: Feb. 6, 2009

(65) Prior Publication Data
US 2010/0199852 A1 Aug. 12, 2010

(51) Int. Cl.
*A47J 31/06* (2006.01)

(52) U.S. Cl. .................. 99/299; 99/306; 99/323

(58) Field of Classification Search .............. 99/299, 99/323, 304, 306, 307
See application file for complete search history.

(56) References Cited

U.S. PATENT DOCUMENTS

| | | | |
|---|---|---|---|
| 1,962,165 A * | 6/1934 | Wilcox | 99/282 |
| 1,990,508 A * | 2/1935 | Wilcox | 99/282 |
| 3,374,897 A | 3/1968 | Martin | |
| 3,473,463 A * | 10/1969 | McKnight et al. | 99/307 |
| D241,402 S | 9/1976 | Painter | |
| 4,149,454 A | 4/1979 | Kemp | |
| D256,079 S | 7/1980 | Moncrief | |
| D266,894 S | 11/1982 | Bersten | |
| D288,057 S | 2/1987 | Webster | |
| 4,642,190 A * | 2/1987 | Zimmerman | 210/464 |
| 4,798,222 A * | 1/1989 | Kauffman | 137/132 |
| 5,927,179 A * | 7/1999 | Mordini et al. | 99/304 |
| 6,250,208 B1 * | 6/2001 | Helps et al. | 99/299 |
| 6,279,460 B1 * | 8/2001 | Pope | 99/299 |
| 7,455,011 B2 * | 11/2008 | Brouwer et al. | 99/299 |

* cited by examiner

*Primary Examiner* — Reginald L Alexander
(74) *Attorney, Agent, or Firm* — Paul M Denk

(57) ABSTRACT

A dripless brew basket including a brew basket, having an opening provided through its bottom wall, a vacuum breaker sleeve fixedly mounted thereto, the upper part of the vacuum breaker sleeve having apertures or ports provided therethrough, to allow the brewed beverage to flow into the sleeve and be dispensed from the brew basket, during application. A vacuum breaker cap mounts on to the upper end of the sleeve, to act as a fluid levelers for the brewed beverage provided within the basket, during a brewing operation, and once the brewed beverage has been dispensed through the breaker sleeve, it reaches the bottom level of the sleeve ports, thereby preventing any further discharge of fluid from the brew basket, including the elimination of any drippage, in providing for the dripless brew basket of this invention.

3 Claims, 3 Drawing Sheets

DRIPLESS BREW BASKET

FIELD OF INVENTION

This invention relates to a brew basket, generally for a commercial type of beverage brewer, such as a coffee brewer, but can be used in other brewing apparatuses, and more specifically incorporates technology that substantially reduces if not eliminates the dripping from the brew basket when a pot of coffee or cup of beverage, has been brewed.

BACKGROUND OF INVENTION

A variety of beverages brewers are in the state of the art. Many of them are used for domestic purposes, and a good number of larger sized brewing apparatuses are employed commercially. Most of the brewing apparatuses incorporate a brew basket, through which the heated water is deposited, percolates through the coffee grounds, passed the filter, and then drips the brewed beverage, whether it is tea or coffee, from its basket and into a decanter or other carafe. One of the minor problems associated with the operations of this type of a brewing apparatus is that when the brewing cycle has been completed, and the decanter of fresh beverage is removed, there may be yet a few drops of hot beverage that descends from the brew basket, and either soils the base of the brewing apparatus, or the surrounding counter, and on occasion, if there is sufficient height in its descent, can splash significantly heated beverage onto the user, causing some injury.

The concept of this current invention is to eliminate this excess dripping of a brew beverage, through the use of a means that allows the brew basket to become dripless, thereby eliminating the foregoing discussed problems.

SUMMARY OF THE INVENTION

This invention generally relates to improvements in a brew basket, and more specifically renders the brew basket dripless, once a specified volume decanter of a beverage, such as coffee or tea, has been brewed by the beverage brewing apparatus.

This invention contemplates improvements to the brew basket, used in conjunction with a beverage brewing apparatus, and includes the addition of a siphoning type of over flow device that is added to the bottom of the brew basket, so that it requires a specified volume of liquid that the basket can hold without initiating siphoning, and thereby prevents dripping that can occur with the traditional brew basket.

Essentially, the components that make up the dripless feature of the basket includes an overflow device, incorporating a sleeve that functions as a vacuum breaker within the bottom of the brew basket, being originally affixed thereto by means of a retaining nut and seal. The vacuum breaker cooperates with a breaker cap, that engages upon it, so that there is a required overflow necessitated for the brewed beverage to rise up within the breaker cap, and pass through the flow aperture within the vacuum breaker sleeve, for the brewed beverage to flow out of the basket and into the decanter, during brewing. The beverage is required to rise up within the breaker cap, before it can pass through the vacuum breaker sleeve, during dispensing, once the intake of hot water enters from the brewing apparatus into the grounds of the basket, and when it instantly achieves a level below the vacuum breaker flow ports, the flow of brewed beverage is curtailed, and it has been found that no drippage follows after the completion of a brewing cycle. Thus, when the decanter, reasonably filled from a brewing cycle, is removed, no subsequent drippage takes place from the brew basket.

It is, therefore, the principal object of this invention to provide a dripless brew basket.

Another object of this invention to provide the device that can be added to a brew basket, in order to render it dripless.

Another object to this invention is to provide means for preventing dripping from a brew basket that can be installed as original equipment, it can be subsequently located.

Still another object in this invention is to provide a vacuum breaking means at the bottom of a brew basket wherein a select volume of liquid can be held without initiating siphoning, thereby preventing dripping as can normally occur with the traditional brew basket.

These and other object may become more apparent to those skilled in the art upon review of the summary of the invention as provided herein, and upon undertaken a study of the description of its preferred embodiment, in view of the drawings.

DESCRIPTION OF THE PREFERRED EMBODIMENT

Figure 1:
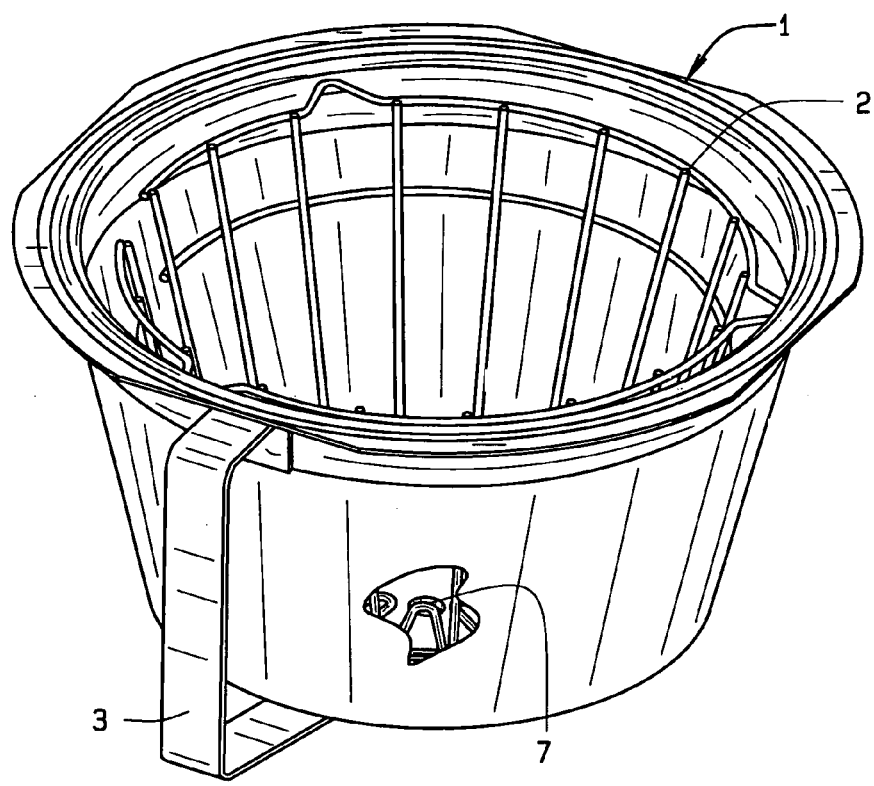
FIG. 1 is a perspective view of the brew basket incorporating the vacuum breaker means of this invention.

In referring to the drawings, and in particular FIG. 1, therein is shown the brew basket 1 of this invention, which is shown incorporating a wire supporting framework 2 provided therein, and such a brew basket normally has the standard handle 3 for accommodating its handling.

Figure 2A:
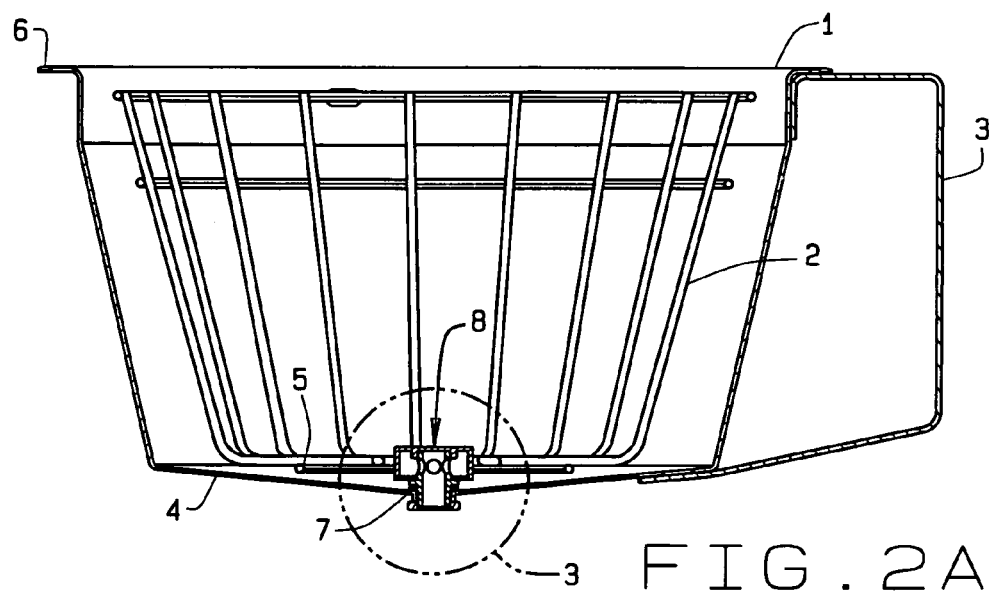
FIG. 2a is a sectional view taken transversely through the brew basket of FIG. 1.
Figure 2B:
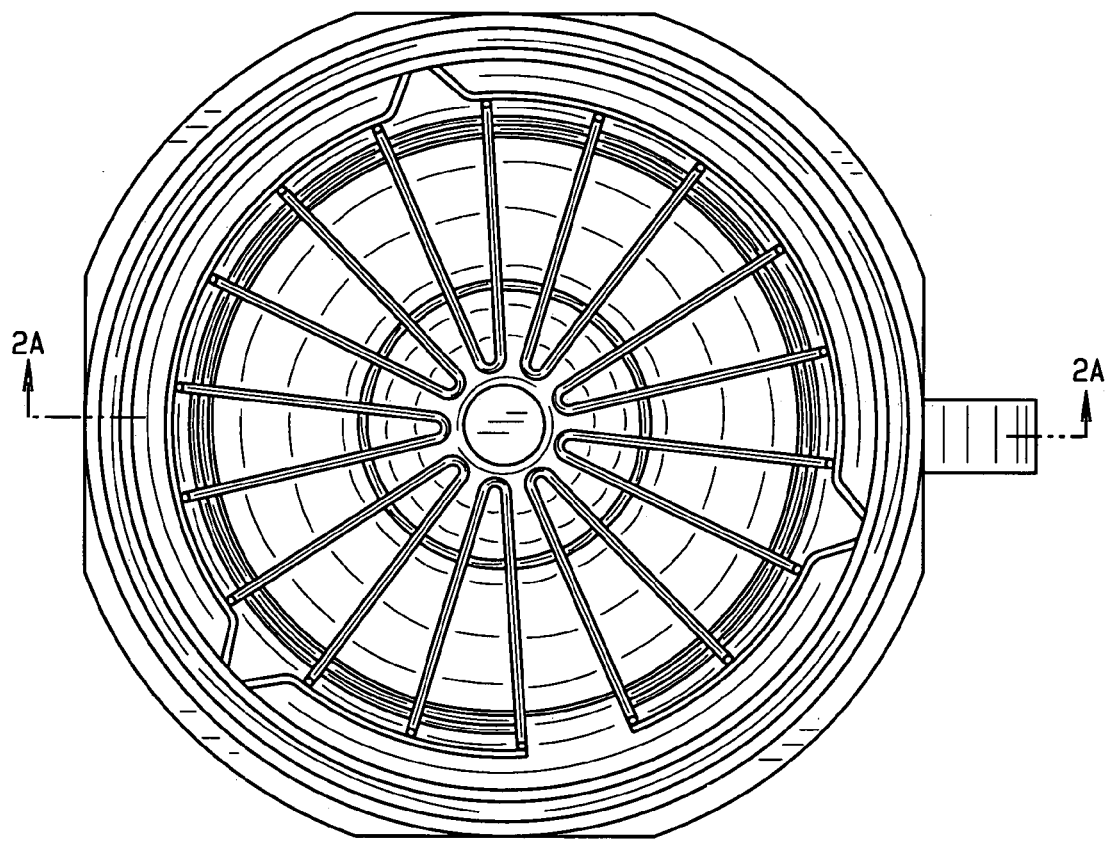
FIG. 2b is a top plan view of the brew basket of FIG. 1.

These components can also be seen in FIGS. 2a and 2b, as can be seen how the wire framework that normally supports the filter, and grounds, during brewing, is arranged elevated slightly off the bottom 4 of the shown brew basket. The bottom of the framework can be noted at 5. Normally such a brew basket has an upper flange 6 provided around its circumference, and the flange is usually embraced by supporting brackets on the underside of the upper segment of the water vessel, that extends cantilever forwardly holding the brew basket, in the structured brewing apparatus.

The bottom of the brew basket normally has an opening, as at 7, and it is through this opening that the vacuum breaker means of this invention, as noted at 8, is installed.

Figure 3:
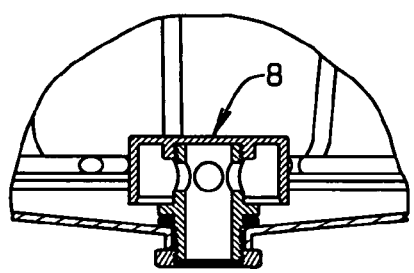
FIG. 3 is a slightly enlarge view of the vacuum breaker means of FIG. 2.
Figure 4:
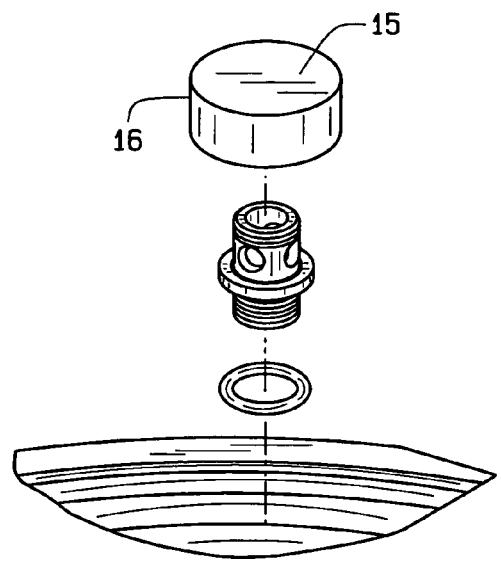
FIG. 4 is an exploded view of the vacuum breaker means as applied to the bottom of the brew basket.
Figure 5:
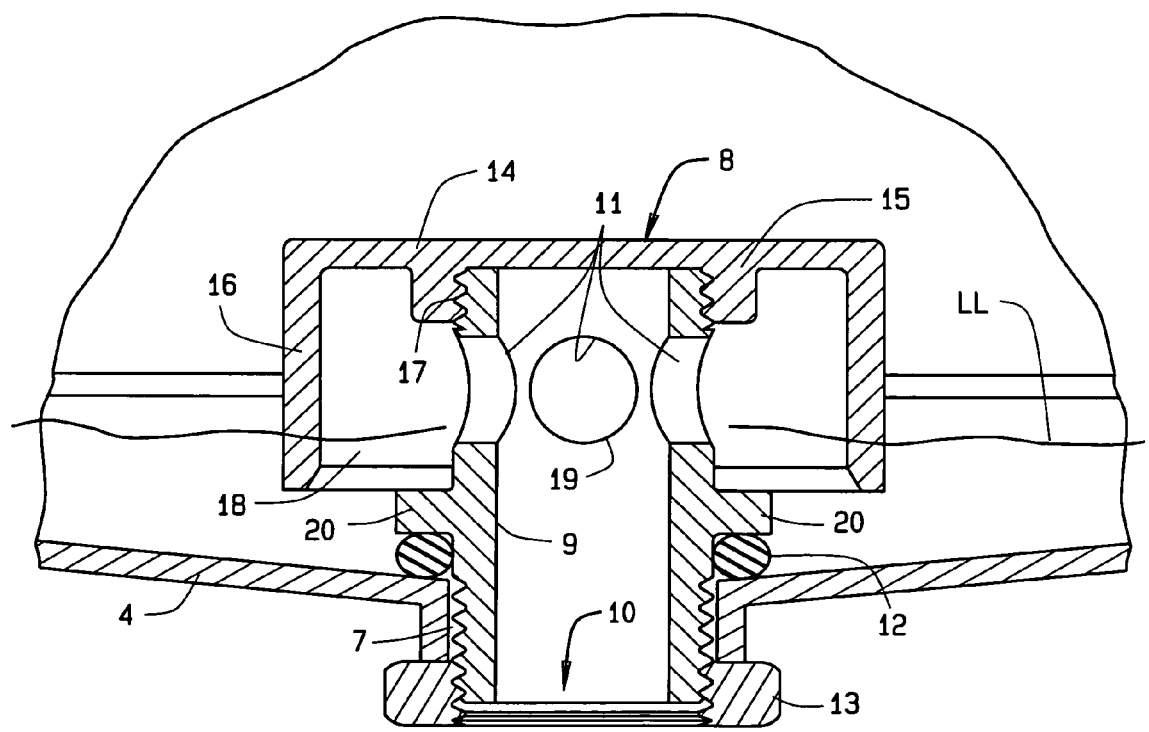
FIG. 5 is an enlarged view of the vacuum breaker means of this invention.

As can also be seen in FIG. 3, in addition to FIG. 5, the vacuum means 8 includes a vacuum breaker sleeve 9 which has a channel 10 provided there through, and in an upper segment of the sleeve are a series of apertures, or flow troughs 11, as will be subsequently described. When the vacuum breaker sleeve 9 is installed in the bottom 4 of the brew basket, it can be seen the sleeve has a perimeter flange 20 extending radially therefrom, and the flange is designed for compressing about an o-ring seal 12 as the retaining nut 13 is threadly tightened upon the bottom of the sleeve 9, as it is being installed. As can be seen, the vacuum breaker sleeve 9 fits through the shown aperture 7 provided through the bottom 4 of the brew basket 1.

In order to provide for the control of the level of liquid within the basket, and to achieve the vacuum breaker concept that eliminates dripping, a vacuum breaker cap 14 is formed having a top wall 15, and downwardly depending sidewalls 16, and has internal threads, as at 17, that engage the top of the vacuum breaker body 9, as can be seen. Thus, the fluid obtains entrance into the vacuum breaker cap 14 through the bottom opening 18 until it obtains a liquid level, as noted at LL, and at which time the brewed beverage will attain access through the ports 11, as along their bottom edges 19, for drainage out of the breaker body sleeve 9, and for flowage of the brewed beverage through the channel 10, and into any decanter or beaker provided underneath of the same, as supported upon the beverage brewing apparatus.

Thus, unlike the standard brew basket, which simply has an aperture and stem provided at its lower central portion, and allows every drop of beverage brewed to flow down the bottom interior of the brew basket 4 and out of its central opening, this particular innovation, through the usage of the vacuum breaker sleeve, its breaker cap, and its mounting to the central bottom opening of the brew basket, once the fluid level reaches that location 19, as the brewed beverage flows out of the basket, it curtails any further flow of fluid, thereby rendering the brew basket dripless, as desired.

Obviously, other means for attachment of a various components of the vacuum breaker means could be used for inter connecting the components together, other than the threaded combination as disclosed. For example, adhesive may be used to apply the breaker cap 14 onto the upper end of the vacuum breaker sleeve 9. And, any type of a pressure fit could be used for connecting the various components together, including the mounting of the retaining nut 13, to the bottom of said sleeve. These are just examples of variations upon the construction of this device.

Variations or modifications to this subject matter of this invention may occur to those skilled in the art upon review the disclosure as provided herein. Such variations, if within the spirit of this development, or intended to be encompassed within the scope of any claims to invention provided in this application. The description of the preferred embodiment, and the disclosure of the invention in the drawings, are set forth for illustrative purposes only.

Therefore, what is claimed of this invention is:

1. A dripless brew basket, including a brew basket, said brew basket having an opening provided through its lower approximate central region, to allow for brewed beverage to be dispensed therefrom, a vacuum breaker sleeve mounted through the opening of the brew basket, said sleeve having at least one discharge port provided therethrough, in its upper region, a vacuum breaker cap connecting with the upper end of the vacuum breaker sleeve, the cap having side wall depending downwardly below the plurality of discharge ports of the vacuum breaker sleeve, said breaker cap having a top wall integrally structured thereon, said top wall providing a solid surface free of any openings provided therethrough to prevent the entrance of any brewing beverage to pass therethrough, said breaker cap having an opening provided through its bottom to allow for the entrance of brewing beverage therein and for controlling the level of liquid entering into the cap, passing through the sleeve discharge ports, such that when the liquid level in the brew basket drops below the discharge ports, no further dispensing of brewed beverage occurs, and thereby preventing the occurrence of any drippage following a brewing operation.

2. The dripless brew basket of claim 1 and wherein said sleeve has a perimeter flange extending outwardly therefrom, and said flange provided for securement of the sleeve through said basket aperture, being fasten thereto by means of a retaining nut.

3. The dripless brew basket of claim of 2 and including an o-ring sealing between the sleeve flange and the proximate edge of the brew basket adjacent aperture to provide a sealing engagement of the vacuum breaker sleeve as mounted through the opening of said brew basket.

* * * * *